350-96.27 SR
XR 3,273,476
SEARCH ROOM
[redacted]
SUBSTITUTE FOR MISSING XR

Sept. 20, 1966 H. E. HAYNES 3,273,476

PHOTOCOMPOSING SYSTEM

Filed May 4, 1964

5 Sheets-Sheet 1

INVENTOR.
HAROLD E. HAYNES
BY
Samuel Cohen
Attorney

INVENTOR.
HAROLD E. HAYNES
BY
Samuel Cohen
Attorney

PHOTOCOMPOSING SYSTEM

Filed May 4, 1964 5 Sheets-Sheet 3

INVENTOR.
HAROLD E. HAYNES
BY [signature]
Attorney

PHOTOCOMPOSING SYSTEM

Filed May 4, 1964 5 Sheets-Sheet 4

INVENTOR.
HAROLD E. HAYNES
BY
Samuel Cohen
Attorney

INVENTOR.
HAROLD E. HAYNES
BY
[signature]
ATTORNEY 3,273,476

PHOTOCOMPOSING SYSTEM

Harold E. Haynes, Haddonfield, N.J., assignor to Radio Corporation of America, a corporation of Delaware Filed May 4, 1964, Ser. No. 364,518
19 Claims. (Cl. 95—4.5)

This invention relates generally to a system for converting information in the form of a stored binary code into text material, such as columns of print, from which multiple copies can be produced.

In the arrangement of the invention, a storage matrix stores a plurality of characters. Circuits responsive to a stored binary code indicative of a desired character in the matrix derive from the matrix video signals indicative of the desired character. These are applied to a display means, such as a kinescope, which displays along a single dimension of the screen thereof successive traces intensity modulated by the video signals. A scanning system, which may include rotating lenses, projects the successive traces appearing on the screen of the display means onto a recording medium in parallel side-by-side relationship to trace out the desired character. The recording medium may be a film from which a printing "master" may be made for producing multiple copies.

The invention is discussed in greater detail below and is shown in the following drawings, of which:

Figure 1:
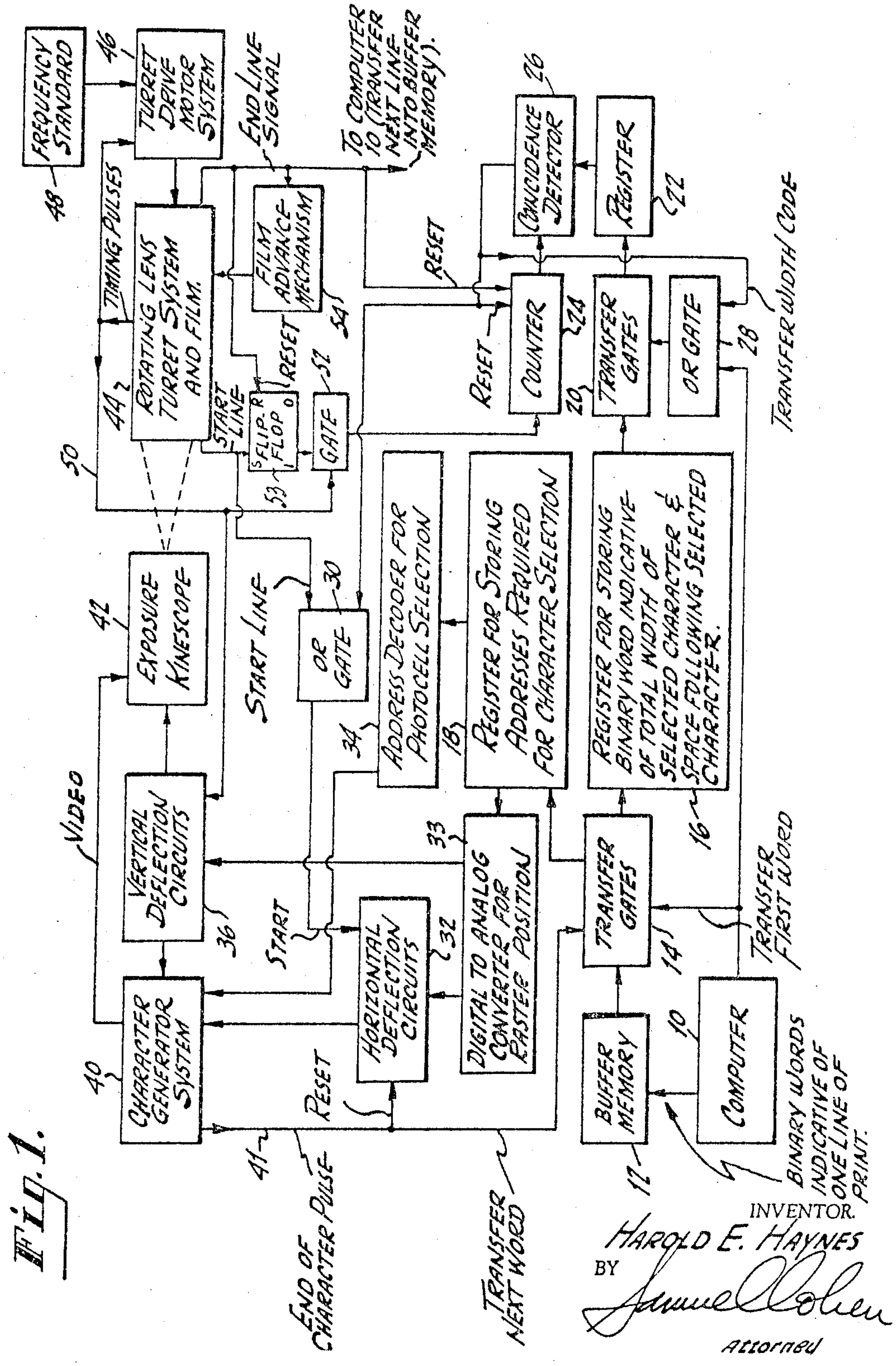
FIGURE 1 is a block circuit diagram of the present invention.

In the system of FIGURE 1, the computer 10 may be a commercially available digital data processing system, such as the RCA 301 computer. It supplies a plurality of binary words to the buffer memory 12. These words are indicative of addresses in an optical storage matrix of a sufficient number of characters to make up one line of print. These words also indicate the width to be allotted to each of the characters and to the space following each character. The binary information is properly justified and hyphenated in a manner well understood in the art.

The function of the transfer gates 14 is to permit the transfer of one word at a time from the buffer memory 12 to the registers 16 and 18. Register 16 receives a part of the word indicative of the width of a character and the space following said character. Register 18 receives the remaining portion of the word. This remaining portion indicates an address of a desired character in the character generator system 40, to be discussed shortly.

The register 16 is connected through transfer gates 20 to a register 22. The output of register 22 is compared with the count recorded in a counter 24 by the coincidence detector 26. When the counts are equal, the coincidence detector 26 supplies an output signal to OR gate 28, counter 24 and OR gate 30. The signal applied to OR gate 28 causes register 16 to transfer another character width code through the transfer gates 20 to register 22. The signal applied to counter 24 resets the counter to zero. The signal applied to OR gate 30 causes the OR gate 30 to produce a start signal for the horizontal deflection circuits 32.

The output of register 18 is applied to the digital-to-analog converter 33 and the address decoder 34. The digital-to-analog converter 33 applies centering voltages to the horizontal deflection circuits 32 and the vertical deflection circuits 36. The circuits 32 and 36 together produce a scan raster of fixed size which is applied to a kinescope in the character generator system 40. The centering voltages supplied by digital-to-analog converter 33 cause this raster to be positioned in one of 16 different locations, as is discussed in more detail later.

The character generator system 40 includes a bank of photocells. Each of the photocells is connected through a gate to the exposure kinescope 42. The address decoder 34 causes one of the gates to be active and the others to be inactive. The active gate permits video signals indicative of a selected character to be applied to the exposure kinescope 42.

The exposure kinescope is connected to the vertical deflection circuits 36 but has no horizontal deflection voltages applied thereto. Accordingly, an intensity modulated trace appears only along a single dimension of the exposure kinescope screen 42. This trace is projected onto a fixed mirror within the turret system 44. The mirror reflects the image of the trace through a continuously moving lens onto a film or other permanent record medium. The successive sweeps on the exposure kinescope are caused by the moving lens to scan out the character selected by the system along the transverse dimension of the film, as is discussed in more detail later.

The rotating lens and turret system is driven by a drive motor system 46. The turret may include three tracks on which information is recorded. The tracks may include optical, magnetic, or other recorded information. One of the tracks generates timing pulses at a frequency related to that at which the drive motor drives the turret. The frequency of these timing pulses may be compared with the frequency of signals from a frequency standard 48, such as a crystal controlled oscillator. Any deviation between the frequency of the timing pulses and that of the frequency standard may be employed to correct the speed of the drive motor so as to maintain that speed constant, in a manner well understood in the art.

The timing pulses from the turret system are also applied via a lead 50 to AND gate 52. Also connected to the input of the gate 52 is a two-state device, such as a flip-flop 53. The set terminal of the flip-flop is connected to receive a "line start" signal from the second track on the drum. This sets the flip-flop, which is connected to prime the gate, when set. Accordingly, when a start signal occurs, timing pulses are applied through gate 52 to the counter 24 which counts the timing pulses.

There is a third track on the drum which contains information as to the end of the line. When an end of the line occurs, an "end of line" signal appears which is applied to the reset terminal of the flip-flop 53. When the flip-flop is reset, it applies a disabling output level to AND gate 52. The "end of line" signal is also applied as a reset input to counter 24.

The "end of line" signal is also applied to the film advance mechanism 54. The film advance mechanism thereupon causes the film to advance, so that a new line of information can be written thereon. The "end of line" signal is also applied to the computer 10 to cause the computer to transfer another group of binary words to the memory buffer 12.

A detailed explanation of the operation of the system of FIGURE 1 will be more meaningful after an explanation of the character generator system 40 and the rotating lens turret system 44. A schematic showing of the character generator system appears in FIGURE 2. The system includes a kinescope 60 to which the horizontal and vertical deflection circuits 32 and 36 of FIGURE 1 are connected. These circuits produce a scan raster on the kinescope screen. The scan raster can assume any one of 16 different positions in accordance with the centering voltages applied to the deflection circuits. In the example chosen for illustration, the raster 62 appears in row 2 in column *d*. The raster consists of vertical sweeps at a repetition frequency determined by the speed of rotation of the rotating lens turret, the latter to be discussed later. The horizontal sweep rate is substantially lower than the vertical sweep frequency.

The image of the raster 62 is applied by an optical tunnel 64 and lens 66 to an optical memory matrix 68. The elements 64 and 66 essentially cause the single raster 62 to be multiplied into nine rasters projected onto the optical memory matrix. The operation of the optical tunnel is discussed in co-pending application Serial No. 3921, "Optical Memory," by D. J. Parker et al., filed January 21, 1960, and assigned to the same assignee as the present application, and elsewhere in the literature.

The optical memory matrix 68 includes six sub-areas in which characters are stored, and two sub-areas containing vertical and horizontal lines, respectively, for centering purposes. The raster illumination appears at the same relative location in each of the memory matrix sub-areas (location *d*2 in this example), as it does on the kinescope screen. This causes six different characters, each in a different sub-area, to be illuminated. For example, in sub-area AI, the character G is illuminated; in sub-area BI, the character A is illuminated; and so on. The illuminated characters and the illuminated regions of sub-areas CI and CII are projected onto the eight photocells 70 respectively. The photocells FI and FII provide output information which is fed back to the kinescope 60 for purposes of fine centering the kinescope raster 62. A detailed discussion as to how this centering may be accomplished appears in Patent No. 2,830,285, R. C. Davis et al., issued April 8, 1958. Accordingly, the feedback circuits are not shown in detail, but are shown by a single block 73 in the following FIGURE 3.

The photocells in the six sub-areas in columns D and E are connected to six gates, respectively, indicated schematically by block 72. One of the gates is primed by a priming signal from the address decoder 34 of FIGURE 1 and the remaining gates are inactive. In the example chosen for illustration, the gate for photocell DIII is active, whereas all other gates are inactive. Accordingly, the video signals produced by photocell DIII, which signals are indicative of the character 5 in location *d*2 of sub-area AIII, are applied through the enabled gate in block 72 to the exposure kinescope 42. This exposure kinescope receives only vertical deflection voltages and, accordingly, the video signals appear on the kinescope screen 42 as an intensity modulated trace. The video output of the enabled gate in block 72 is also applied to a circuit 74 for producing an "end character" pulse. A more detailed discussion of this circuit appears later in connection with FIGURES 4 and 5.

Figure 2:
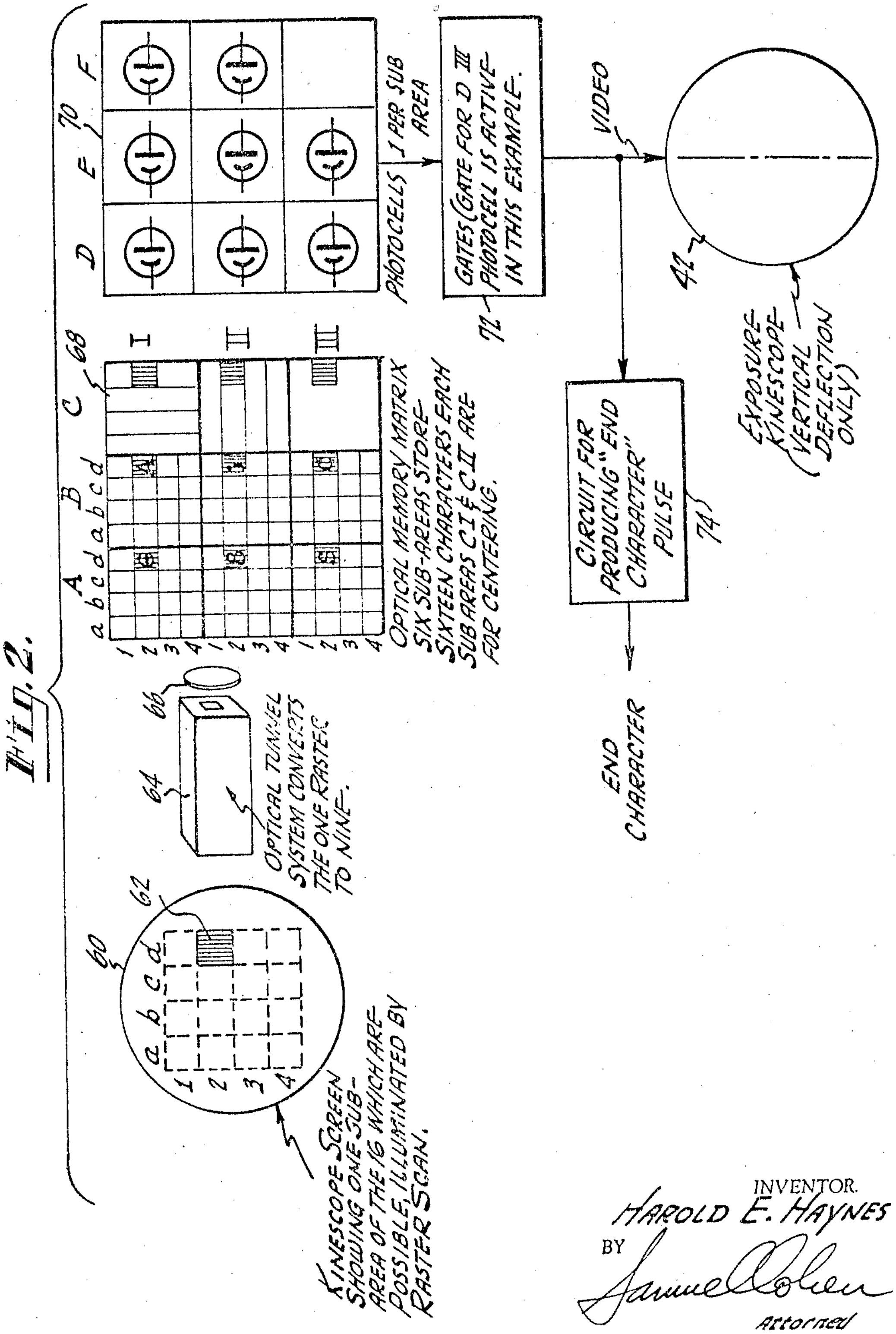
FIGURE 2 is a schematic showing of the character generator system of FIGURE 1.
Figure 3:
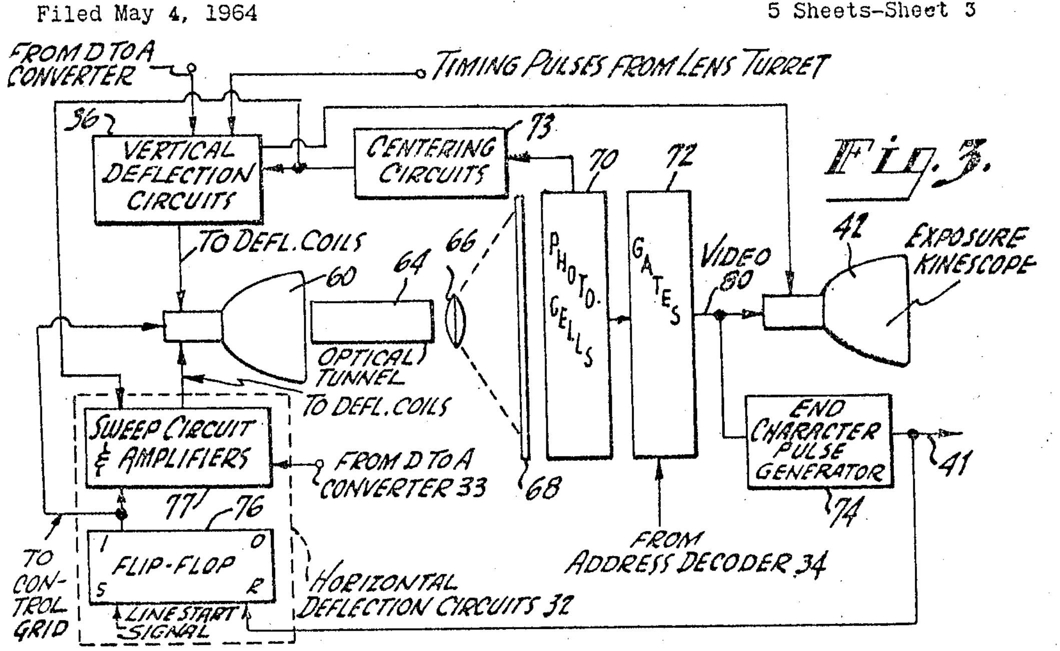
FIGURE 3 is a block circuit diagram of the character generator system of FIGURE 1.

In the discussion of the operation of FIGURE 2 which follows, both FIGURES 2 and 3 should be referred to. The vertical and horizontal deflection circuits 32 and 36 together provide a scan raster which is supplied to the deflection coils of the illumination kinescope 60. The digital-to-analog converter 33 of FIGURE 1 applies appropriate centering voltages to the deflection circuits 32 and 36 to cause the raster to be positioned at a desired one of the 16 possible locations on the kinescope screen. The centering circuits 73 feed back information derived from the photocells FI and FII, indicative of any fine centering required precisely to position the scan raster where desired.

When a "line start" signal is received from the line start track on the rotating lens turret (discussed later in connection with FIGURE 7), this signal sets a flip-flop 76 within the horizontal deflection circuits 32. This flip-flop applies a bias voltage to the control grid of illumination kinescope 60 causing the raster to go on, that is, to appear as a bright light source. The sweep circuit of block 77 may initially be "disabled" by clamping an integrating capacitor therein to a fixed voltage level, in well known fashion, or by otherwise preventing the start of the "ramp" waveform. The bias voltage applied by flip-flop 76 may be employed to remove the clamping voltage level or otherwise to permit the ramp to be generated.

The optical tunnel 64 projects the bright raster onto the optical memory matrix 68. The address decoder 34 of FIGURE 1 applies an enabling voltage to a particular one of the gates 72 for selection of the one character desired from the six illuminated on the optical memory matrix. The successive vertical sweeps traced out tby the raster are converted by the photocell to electrical signals which are applied via lead 80 to the control grid of the exposure kinescope 42, and to the end character pulse generator 74.

Figure 4:
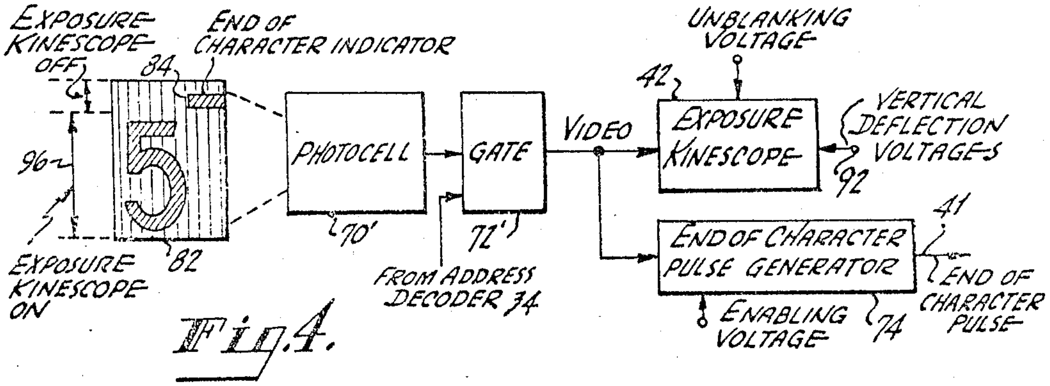
FIGURE 4 is a more detailed block circuit diagram of a portion of the character generator of FIGURE 3.

A more detailed showing of a character of the matrix appears at 82 in FIGURE 4. In addition to the character itself, at the upper part of the area scanned, there is a black, for example, end of character indicator 84. The information scanned from the optical memory matrix is supplied to a particular one 70′ of the photocells. The latter applies its output to a particular one 72′ of the gates. The second input to this particular gate is a priming signal from the address decoder 34. The video output signal from the gate 72′ is applied to the exposure kinescope 42 and the end of character pulse generator 74

Figure 5:
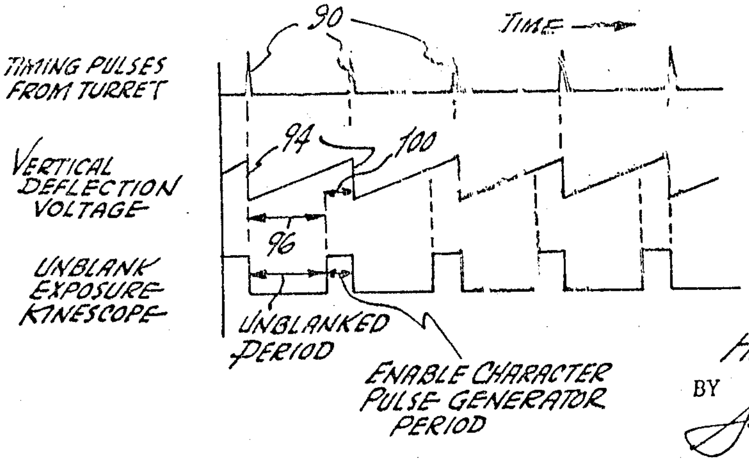
FIGURE 5 is a drawing of waveforms to help explain the operation of the circuit of FIGURE 4.

The various waveforms involved are shown in FIGURE 5. The timing pulses from the turret appear at 90, and the vertical deflection voltages applied to terminal 92 appear at 94. The first portion 96 of each vertical sweep contains information as to the character being scanned. During this portion of the sweep, the kinescope 42 is unblanked, as indicated at 96. During the portion 100 of each vertical sweep, the end of pulse generator 74 is primed. If during this period of sweep, the light input to the photocell is sharply reduced, as would occur if the end of character indicator 84 were scanned, then the end of character pulse generator produces an end of character pulse at lead 41. This end of character pulse is employed to reset the horizontal deflection circuits and to cause the next character in the buffer memory 12 in FIGURE 1 to be transferred through the buffer gate 14, as is discussed in more detail later.

Figures 6, 7:
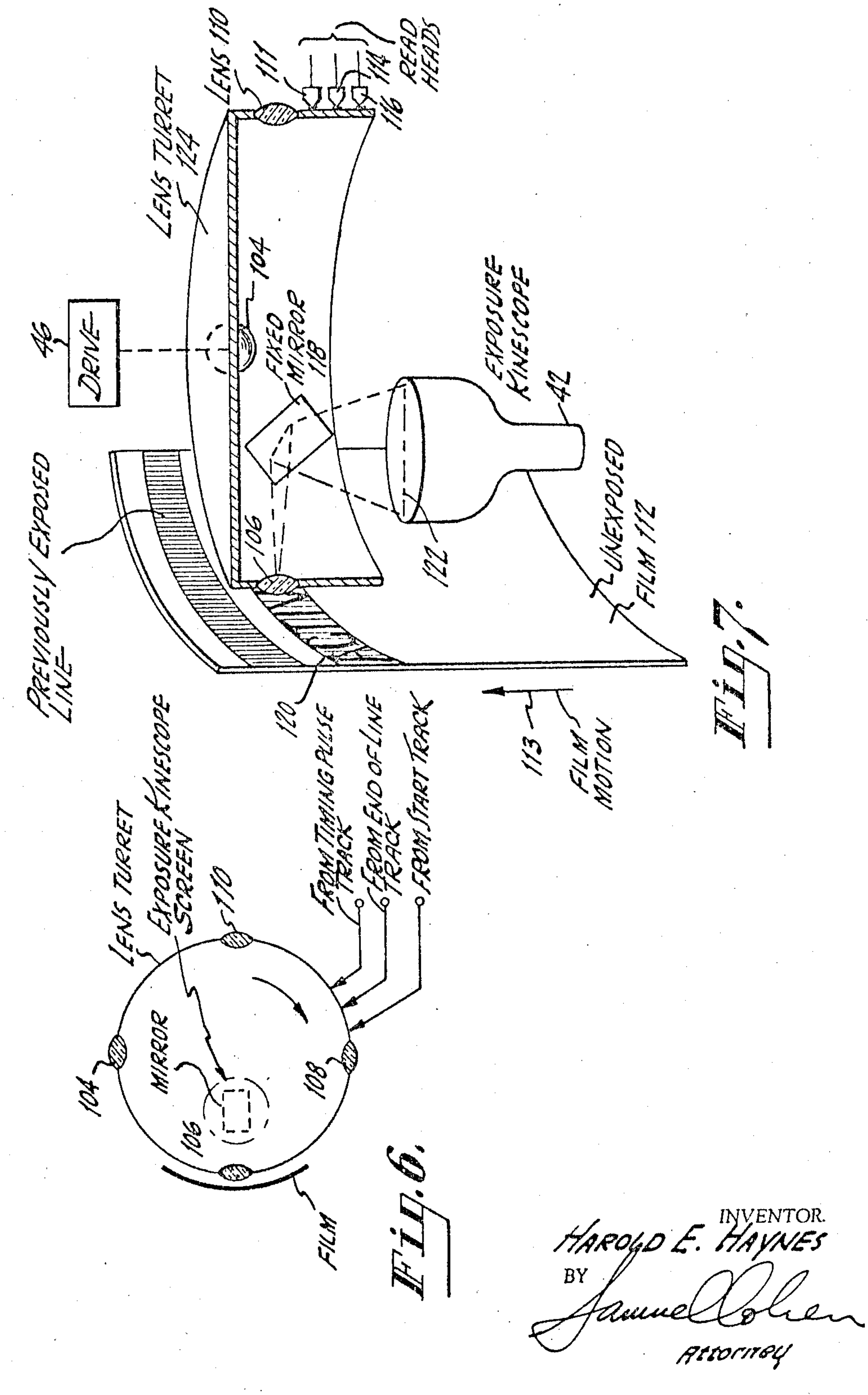
FIGURE 6 is a schematic showing of the rotating lens turret system of the present invention.
FIGURE 7 is a perspective view, partly in cross-section, of the arrangement of FIGURE 6.

The rotating lens turrent system is shown in more detail in FIGURES 6 and 7. The lens turret shown includes four lenses 104, 106, 108, and 110. These lenses are continuously driven at a relatively high rate of speed by the drive mechanism 46. The rim of the turret includes three tracks on which magnetic information, for example, is recorded. FIGURE 7 shows read heads 111, 114 and 116 adjacent to these tracks. The first track read by head 111 has recorded thereon magnetic indications equally spaced from one another. The second track read by head 114 includes line start signal information. The third track read by head 116 includes end of line signal information.

Beneath the lens turret is the exposure kinescope 42. A fixed mirror 118, which is preferably at an angle of 45° to the drive axis about which the lenses are rotated, is positioned over the kinescope screen. Accordingly, the image on the kinescope screen is projected by the mirror 118 through the lens 106. The position of the trace on the screen is such that its virtual image, as seen in the mirror by the lens, appears to be parallel to the axis about which rotation occurs. And, the distance from the screen of the kinescope to the mirror surface is equal to the distance of the mirror surface from the same axis, so that the virtual image of the trace is actually superimposed on this axis. In this way, the image produced by the lens remains in focus as the lens moves (since the distance between the virtual image and the lens remains constant as the lens moves).

An unexposed film 112 is located adjacent to the lens turret and is curved to conform with the path taken by the lenses as they are rotated. The film advance mechanism (not shown in FIGURES 6 and 7), when actuated moves the film in the direction indicated in FIGURE 7, through a discrete distance. The distance is such that a new line of information may be written spaced from the line of information previously recorded.

In the operation of the system of FIGURES 6 and 7, when the line start signal occurs, one of the lenses, such as 106, is at the extreme left edge 120 of the film 112. Successive vertical traces 122 appear on the exposure kinescope 42. At the same time, the lens turret 124 rotates in the clockwise direction, as seen in the figures, so that the successive vertical traces reflected by the fixed mirror 118 and the moving lens 106 appear on successive paths. Each such path is parallel to the long dimension of the film and the successive paths extend in a direction transverse to the long dimension of the film. These successive adjacent paths trace out on the film the successive sweeps appearing on the exposure kinescope 42. These successive sweeps define the characters which expose the film, as indicated schematically in the figures.

After each character is traced out on the film, there is a period of time, corresponding to the space between characters, during which the various circuits involved select the next character. Upon the completion of this period of time, the coincidence detector 26 (FIGURE 1) produces an output and the tracing out of the next character begins. The successive characters making up a line of print continue to be traced out along the dimension transverse to the long dimension of the film until the end of the line is reached. When the lens 106 approaches the end of line position, the read head 116 generates an end of line signal. This causes a new group of binary words to be transferred to the buffer memory 12 of FIGURE 1. It also causes the film to be advanced in the direction of arrow 113, so that a new line may be recorded.

When the next lens 108 of FIGURE 6 reaches the edge 120 of the film, the next start of line signal occurs (is produced by head 114) and the process discussed above is repeated for the next line of print. In this way successive lines of print are recorded on the film 112. This film may be used to produce multiple copies as, for example, newspapers, books and the like.

In the operation of the system of FIGURE 1, upon receipt of an end of line signal from the rotating lens turret 44, the computer 10 transfers a group of words to the buffer memory. Concurrently, the computer 10 applies a signal both to transfer gates 14 and OR gate 28. This signal causes the first word in the buffer memory to be transferred in part to register 16 and in part to register 18. Also the same word stored in register 16 is transferred through gate 20 to register 22. The word in register 22 is indicative of the width of the first character to be printed plus the space after this character.

The word stored in register 18 is an address of one of the 96 characters in the memory matrix. The first part of the address causes the horizontal and vertical deflection circuits 32 and 36 to illuminate a selected six of the 96 characters stored in the memory matrix within system 40. The second part of the address causes a selected one of the six gates within system 40 to permit one of the six characters illuminated to be scanned out. Video signals pass through this gate to the exposure kinescope 42, these video signals being indicative of the desired character being read from the optical memory matrix.

The video information applied to the exposure kinescope 42 causes successive single line traces to appear on the screen of the kinescope. Shortly before the first trace appears on the kinescope, a line start signal is read from the rotating lens turret. This signal enables AND gate 52, and the timing pulses from the rotating turret are applied through gate 52 to the counter 24. Concurrently, the rotating lens system projects the single line traces appearing on the exposure kinescope onto the film.

When an entire character has been read onto the film, the end of character pulse generator in system 40 generates an output pulse at lead 41. The output pulse resets the horizontal deflection circuits and essentially blanks the kinescope 42. The end of character pulse also is applied to the transfer gates 14, causing the next binary word stored in the buffer memory to be transferred in part to register 18 and in part to register 16. Register 22 continues to store the width code for the character just recorded on the film. The counter 24 continues to count the timing pulses from the rotating lens turret system 44.

When the count recorded in counter 24 is equal to the count indicative of character width stored in the register 22, coincidence detector 26 produces an output. This output is applied through OR gate 30 to the horizontal deflection circuits causing them again to be activated. The vertical deflection circuits are already active, since they were never turned off. Further, when the start signal is applied to the horizontal deflection circuits, the control grid of the kinescope in system 40 is again driven above cut-off, so that a raster is traced on the kinescope (kinescope 60 of FIGURE 3). This raster is positioned to select six characters in the optical storage memory, these six characters including the desired next character. At the same time the address decoder 34 activates a selected gate of the six within system 40 to permit video information relating to the next selected character to be read out to the exposure kinescope 42.

The output of the coincidence detector 26 is also applied to counter 24 as a reset signal. This resets the count stored in the counter to zero. The gate 52 is still enabled since the end of line signal has not occurred, so that counter 24 again begins to count timing pulses.

The output signal of coincidence detector 26 is also applied through OR gate 28 to the transfer gates 20. The transfer gates thereupon transfer the binary word indicative of the width of the next character from register 16 to register 22.

The operation described above continues until the last word in the buffer memory is shifted to the two registers 16 and 18. This causes the last character in a line to be projected onto the film by the rotating lens turret system 44. This last character will generally appear close to the right edge of the film, as viewed in FIGURE 7. Shortly after this last character is exposed, the rotating lens turret system produces an end of line signal. This causes the film advance mechanism to shift the film upward, as shown in FIGURE 7, to the next line. The end of line signal also causes the computer 10 to transfer the next group of binary words from the computer to the buffer memory. The end of line signal also is applied as an inhibit signal to gate 52. This cuts gate 52 off and prevents timing pulses from being applied to the counter 24 until the line start signal occurs. Finally, the end of line signal is applied as a reset signal to counter 24, resetting the count to zero.

Figure 8:
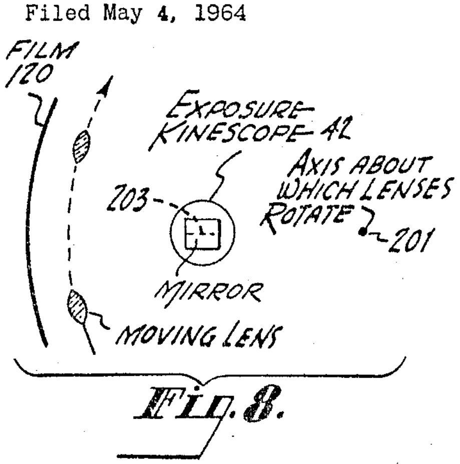
FIGURE 8 is a schematic showing of a kinescope, mirror and lens, similar to the showing of FIGURE 6.

The lens turret system of FIGURE 6 is shown again in schematic form in FIGURE 8. The axis about which the lens rotates is indicated by the dot 201. The mirror is located between the axis and the moving lens. The exposure kinescope is beneath the mirror, and the single trace appearing on the kinescope is indicated by the dashed line 203.

Figure 9:
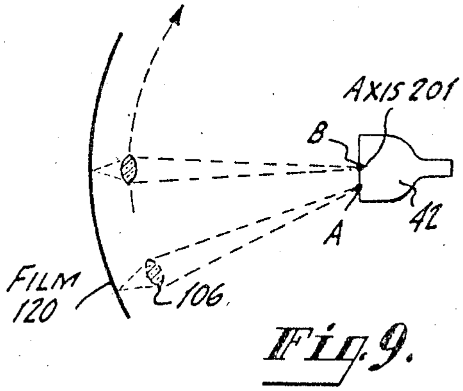
FIGURE 9 is an equivalent diagram of the arrangement of FIGURE 8.

An equivalent sketch of the arrangement of FIGURE 8 from which the mirror has been omitted is shown in FIGURE 9. The single trace on the exposure kinescope 42 lies on the axis 201. The trace direction is into and out of the paper, as viewed in the figure. As the lens 106 moves, the spacing between the lens and the trace on the screen remains constant, and the image on the film produced by the lens therefore remains in focus as the lens moves.

With the arrangement discussed above, it is generally not possible to use the exposure kinescope at the maximum intensity it is capable of producing. This is because the traces lie on the same line and, when at full intensity, may cause the screen to burn out in a relatively short time. The light intensity on the kinescope screen could be increased if it were possible to scan the trace horizontally (in the direction B to A in the figure). However, as shown in FIGURE 9, if the trace were so scanned, it would be closer to the film when in position A, which is off the axis 201, than when the trace were at position B on the axis 201.

Figure 10:
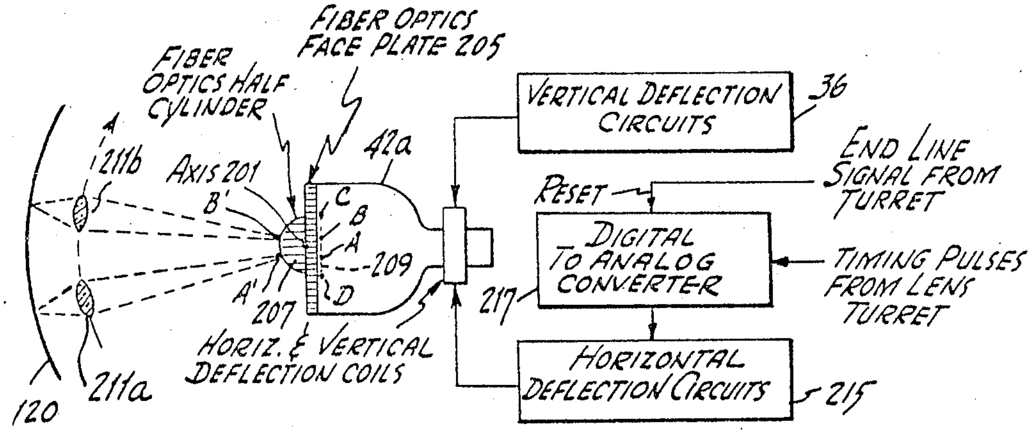
FIGURE 10 is a schematic diagram of a modified form of an exposure kinescope system, in the arrangement of the invention.

A solution to this problem is shown in FIGURE 10. A kinescope 42*a*, having a fiber optics face plate 205, is employed rather than the conventional kinescope 42. In addition, a fiber optics element 207 in the shape of a half-cylinder is fixed to the face plate. The fibers in the element 207 are essentially parallel to the fibers in the fiber optics face plate 205. The cylindrical surface of the element 207 is at all points equidistant from the axis 201 about which the lenses rotate.

In the operation of the arrangement of FIGURE 10, the trace, which extends in a direction into the paper, is scanned along the path indicated by dotted line 209, in synchronism with the movement of the lens. A trace appearing at A is conveyed by the fiber optics face plate and half-cylinder to position A′. Correspondingly, the image of a trace appearing at B is conveyed by the fiber optics elements to position B′. Position A′ is equally distant from the lens when the latter is at position 211*a* as position B′ is from the lens when it is at position 211*b*. Accordingly, the image of the trace remains in focus on the film as the lens and trace move.

The circuit shown in FIGURE 10 enables the image of the trace to move synchronously with the lens. The circuit includes the same vertical deflection circuits 36 as appear in the previous figures. In addition, there are horizontal deflection circuits 215 which are connected to the horizontal deflection means of the kinescope 42*a*. The amplitude of the horizontal sweep is determined by the amplitude of the analog voltage produced by digital-to-analog converter 217. Converter 217 may include a non-linear circuit to provide proper tracking of the trace image and the lens. The latter converts the timing pulses from the lens turret to analog signals. When an end of line signal is produced, the digital-to-analog converter is reset to its initial position, and the trace position moves from C back to the initial position D.

Figure 11:
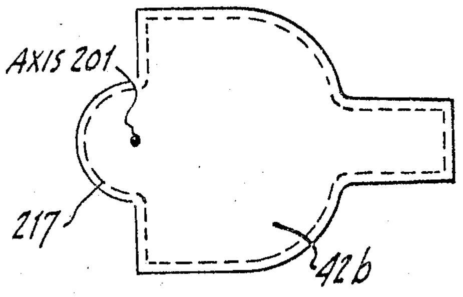
FIGURE 11 is a showing of a different form of kinescope which may be used in the arrangement of FIGURE 10.

In the arrangement of FIGURE 10, degraded performance results with fibers parallel to the tube axis as the light emanating from the fibers at the end portions of the half-cylinder is a substantial number of degrees off the axes of the fibers and the fiber ends are cut off at increasingly acute angles. The alternative kinescope 42*b* of FIGURE 11 avoids this disadvantage. This kinescope has a special cylindrical section molded or ground onto its face plate. The surface 217 of the kinescope is positioned equally distant from the axis 201. The remainder of the system is precisely the same as the system of FIGURE 10 and is therefore not illustrated. In the circuit of FIGURE 11, it is desirable to incorporate in the circuits for the kinescope means to provide focus modulation of the cathode ray beam to optimize (maintain substantially fixed) the spot size appearing on the screen.

While in the arrangements of FIGURES 10 and 11 the kinescopes are shown positioned at the axis of rotation of the lens turret, in practical arrangements it is preferred that a mirror be used and the kinescope positioned beneath the mirror, as shown in FIGURE 8. (This is because of the relatively large size of the kinescope.) The positioning of the kinescope is such that the point corresponding to 201 on the tube, in each case, appears to coincide with the axis about which the lens rotates. In other words, the distance through which a light ray travels from a trace on the cylindrical surface of the kinescope to the mirror to the lens remains relatively constant as the lens and trace move in synchronism, just as in the schematic showing of FIGURE 10.

Various ones of the logic circuits which are shown in block form in the figures are in themselves well known and are therefore not described in detail. For example, the transfer gates 14 of FIGURE 1 may comprise a group of AND gates. The buffer memory 12 may be a group of flip-flops, and each flip-flop may have one AND gate connected between its "1" output terminal and the set terminal of the corresponding flip-flop in the following registers. With one AND gate per buffer memory stage, the registers 16 and 18 should, in each case, be reset prior to the transfer of a word. The reset signal producing means is not shown in FIGURE 1, but may, for example, be a logic gate which derives the reset signal from the "transfer next word" signal on lead 41 and the "transfer first word" signal from the computer. Alternatively, so-called jam transfer may be employed, in which case separate reset signals for the registers are not required. In this case, there are two output AND gates for each buffer memory stage. One such gate is connected between the "1" output terminal of a flip-flop in the buffer memory and the set terminal in the corresponding flip-flop of the following registers; and the other such gate is connected between the "0" output terminal of the flip-flop in the buffer memory and the reset terminal of the corresponding flip-flop in the following registers.

In the system illustrated, there are three timing tracks on the rotating lens turret system. Fewer timing tracks than this can be employed provided a suitable decoder is connected, for example, to a single timing track carrying both the "end line" and "start line" signals. This decoder may include a pair of gates, one responsive to the "end line" signals and the other to the "start line" signals, each for producing an output at the appropriate time. Or, the decoders may include counters coupled to the clock pulse track and circuits such as 22, 26 of FIGURE 1, for producing outputs after different counts.

The vertical sweeps of the raster scan, shown in FIGURE 7, start at the bottom and sweep upward. The direction of sweep may, if desired, be reversed. Further, the end of character indicator may be placed close to the bottom edge of the scanned area rather than at the top edge thereof.

In the embodiment of the invention illustrated, the rotating turret includes four lenses so that one complete revolution of the lens turret corresponds to the writing of four lines on the film. It is to be appreciated that the invention is not limited to this specific number of lenses. As one example, eight lenses may be employed for writing eight lines of information per lens turret revolution.

In the invention illustrated, the kinescope 42 of FIGURE 7 is employed to convert electrical signals to printed information on a film. The electrical signals cause the exposure kinescope 42 to produce intensity modulated traces along a single dimension of the screen. It is also possible to use a similar system for converting information appearing on a transparency, such as a film, to electrical information. Here, the successive traces appearing along the single dimension of the screen of the kinescope 42 are not intensity modulated, but are of uniform intensity. The film 112 has information recorded thereon, that is, the film is exposed and developed. In this case, the exposure kinescope serves as a light source for illuminating the film as the lens turret rotates. The light passing through the film becomes intensity modulated by the intelligence on the film. A photocell placed behind the film may be employed to receive this information. In addition, fiber optics may be employed between the film 112 and the photocell to convey the intensity modulated light to the photocell. The output of the photocell is an electrical signal modulated in accordance with the intelligence appearing on the film.

What is claimed is:

1. In combination, means for storing a binary code indicative of a character it is desired to print;

an optical storage matrix in which a plurality of characters, including the desired one, are stored;

a light source responsive to said stored binary code for scanning, in raster fashion, the desired character;

light sensing means for deriving from the scanned character video signals indicative thereof;

a display means for displaying successive traces intensity modulated by said video signals;

a recording medium; and a rotatable lens system for projecting the successive traces onto said recording medium along parallel side-by-side paths to trace out said desired character.

2. In the combination set forth in claim 1, said light source comprising a kinescope, and horizontal and vertical deflection circuits coupled to the kinescope for deflecting the electron beam thereof in raster fashion, and further including:

means for deriving from the rotatable lens system timing signals at a frequency related to the speed of rotation of the lens system; and means for applying said signals to one of said deflection circuits for synchronizing the deflection of said electron beam with the rotation of the lens system.

3. In combination, means for storing a binary code indicative of the character it is desired to print and a width dimension associated with this character;

a storage matrix in which a plurality of characters, including the desired character, are stored;

means responsive to a first portion of said binary code for deriving from said matrix video signals indicative of the desired character;

a display means for displaying successive traces intensity modulated by said video signals;

a recording medium;

an optical scanning system, including means for generating timing pulses at a frequency dependent upon the scanning speed of said system, for projecting the successive traces appearing on said display means onto said recording medium along parallel side-by-side paths to trace out the selected character; and means responsive to the portion of said binary code indicative of the width dimension associated with said character and to the clock pulses derived from the scanning system for causing video signals to be produced which are indicative of the next character it is desired to print.

4. In combination, storage means for storing a binary code indicative of the character it is desired to print and the width of this character and the space following the character;

a storage matrix in which a plurality of characters, including the desired character, are stored;

means responsive to a first portion of said binary code for scanning the desired character in said matrix and deriving therefrom video signals indicative of the desired character;

a display means for displaying successive traces intensity modulated by said video signals;

a recording medium;

an optical scanning system, including means for generating clock pulses at a frequency dependent upon the scanning speed of said system, for projecting the successive traces appearing on said display means onto said recording medium along parallel side-by-side paths to trace out the selected character;

means for deriving from the video signals indicative of the desired character an output signal when the entire character has been scanned;

means responsive to this output signal for transferring to the storage means a new code indicative of the next character it is desired to print; and means responsive to a comparison of the portion of said binary code indicative of the width of the first-mentioned character and the space following the same, with a count indicative of the clock pulses derived from the scanning system, for deriving from said storage matrix video signals indicative of said next character it is desired to print.

5. In combination, a stationary screen on which time sequential, intensity, modulated traces appear;

a length of intermittently movable recording medium;

a moving lens system for projecting the intensity modulated traces onto successive, parallel, side-by-side positions on the recording medium during a time interval in which the recording medium is stationary, said side-by-side positions extending in a direction transverse to the length of the recording medium;

means associated with the lens system for generating an end line signal when the edge of the recording medium is approached; and an advance mechanism for the recording medium for moving the latter a discrete amount in the direction of the length of the medium, in response to the end line signal.

6. In combination, a lens system including a lens, and means for driving said lens along a path about a central axis;

a stationary light reflecting means inclined at an angle to said central axis, located between said axis and the path taken by the lens, and facing the closer portion of the path taken by the lens; and means facing the light reflecting means for producing a luminous trace so oriented with respect to the light reflecting means that the virtual image of the trace in the light reflecting means, as viewed from the lens, is parallel to said central axis and a fixed distance from the lens.

7. In combination, a lens system including a lens, and means for driving said lens along a circular path about a central axis;

a stationary mirror inclined at an angle to the central axis, located between said axis and the path taken by the lens and facing the closer portion of the path taken by the lens;

a cathode ray tube, the screen of which faces the mirror; and means coupled to said tube for producing successive traces along a single dimension of said screen at an angle such that their virtual image in the mirror, viewed from the lens, is parallel to said central axis, and said screen being spaced from the mirror a distance such that said virtual image, viewed from the lens, lies on said axis.

8. In combination, a display screen which produces, along a single dimension thereof, a luminous trace;

a lens system including a lens which moves along a circular path about a central axis; and a mirror located between the axis and the lens for projecting an image of the trace through the lens, as the lens moves, the total distance between the display screen, mirror and lens being substantially equal to the radius of the circle along which the lens moves.

9. In combination,
a display screen which produces, parallel to a given dimension thereof, successive luminous traces;
a lens system including a plurality of lenses, all equidistant from a central axis, and all movable along a circular path about said central axis; and
a mirror located between said central axis and a portion of the path taken by the lenses for projecting an image of the traces through successive ones of the lenses, as the lenses move, the total distance along a light ray between the trace on the display screen, mirror and a lens which projects the image, remaining substantially constant as the lens moves, and the orientation of the luminous traces being such that their virtual image, as seen by said lens which projects the image, is always parallel to said central axis.

10. In combination,
a lens system including a plurality of lenses, all equidistant from a central axis, and means for driving said lenses along a circular path about said central axis;
a stationary light reflecting element inclined at an angle to the central axis, located between said axis and the path taken by the lenses, and facing the closer portion of the path taken by the lenses;
a cathode ray tube; and
means coupled to said tube for producing successive intensity modulated traces along a single dimension of the screen of said tube and at an angle such that the virtual image in the light reflecting element of said traces, as viewed from a lens, is parallel to said central axis, said screen being spaced from said light reflecting element a distance such that said virtual image, as viewed from said lens, lies on said axis.

11. In combination,
a display screen which produces, along a single dimension thereof, successive luminous traces;
a lens system including a lens which moves along a circular path about a central axis;
a mirror located between said central axis and the lens for projecting an image of said traces through the lens, as the lens moves, the total distance between the display screen, mirror and lens being substantially equal to the radius of the circle along which the lens moves, and the orientation of the luminous traces being such that their virtual image, as seen by the lens, lies on said central axis; and
a light recording medium adjacent to the path taken by the lens, for receiving the image of the trace projected by the mirror.

12. In combination,
a cathode ray beam device which produces, along a single dimension thereof, successive intensity modulated traces;
a lens system including a lens which moves along a circular path about a central axis;
a mirror located between said central axis and the lens for projecting the image of said traces through the lens, as the lens moves, the total distance between the display screen, mirror, and lens being substantially equal to the radius of the circle along which the lens moves, and the orientation of the luminous traces being such that their virtual image, viewed from the lens, lies on said central axis;
a light recording medium located outside of said path, and shaped to be equidistant along its width from said path, for receiving the image projected by the mirror; and
means for advancing said medium, in the direction of its length dimension, when the lens passes the edge of the medium.

13. In combination,
a lens system including a lens which moves along a circular path about a central axis;
a cathode ray beam device which produces, parallel to a single dimension thereof, successive intensity-modulated traces and so located that images of said traces, viewed from said lens, are parallel to said axis, and equidistant from said path;
a light recording medium located outside of said path, and shaped to be equidistant along its width from said path, for receiving the trace images projected by the lens, as the lens moves; and
means for advancing said medium, in the direction of its length dimension, when the lens passes the edge of the medium.

14. In combination,
a lens system including a lens which moves along a circular path about a central axis;
a mirror;
a cathode ray beam device facing the mirror which produces, parallel to a single dimension thereof, successive intensity-modulated traces, said cathode ray beam device being so located that the virtual images in said mirror of said traces, viewed from said lens, are parallel to said axis, and equidistant from said path;
a light recording medium located outside of said path, and shaped to be equidistant along its width from said path, for receiving the trace images reflected from the mirror through the lens, as the lens moves; and
means for advancing said medium, in the direction of its length dimension, when the lens passes the edge of the medium.

15. In combination,
a lens system including a lens which moves along a curved path about a central axis;
display means having a given axis, the image of which axis is parallel to said central axis, and formed with a viewing surface having a curvature about said given axis which is parallel to the curvature of said path;
means coupled to said display means for producing on said viewing surface a straight line trace parallel to said given axis;
means coupled to said display means for sweeping said trace along the curved dimension of said viewing surface in synchronism with the movement of the lens, while maintaining the trace parallel to said given axis; and
a light recording medium adjacent to the path taken by the lens, for receiving the image of the trace projected by the lens.

16. In combination,
a lens system including a lens which moves along a curved path about a central axis;
display means having a given axis, and formed with a viewing surface having a curvature about said given axis which is parallel to the curvature of said path;
means coupled to said display means for producing on said viewing surface a straight line trace parallel to said given axis;
means coupled to said display means for sweeping said trace along the curved dimension of said viewing surface in synchronism with the movement of the lens, while maintaining the trace parallel to said given axis;
reflecting means for reflecting the image of said trace through said lens, as the lens moves, the relative positions of the lens, reflecting means and display means being such that the virtual image of the trace, viewed from the moving lens, is parallel to said central axis and a fixed distance from said lens; and
a light recording medium adjacent to the path taken by the lens, for receiving the image of the trace projected by the lens.

17. In combination:

a lens systems including a lens, and means for driving said lens along a circular path about a central axis;

a stationary mirror inclined at an angle to the central axis, located between said axis and the path taken by the lens and facing the closer portion of the path taken by the lens;

a cathode ray tube formed with a viewing surface, a portion of which is of circular curvature and faces the mirror, and which is oriented so that a line image on said viewing surface which is parallel to the axis of portion of the viewing surface of circular curvature creates a virtual image in the mirror which superimposes on the central axis of the circular path followed by said lens; and means coupled to said tube for producing successive side-by-side parallel traces on said portion of circular curvature of said viewing surface and parallel to its axis.

18. In the combination set forth in claim 17, said viewing surface comprising the surface of a fiber optics half cylinder.

19. In the combination as set forth in claim 17, said viewing surface comprising a glass hollow half cylinder, the inner surface of which is also of circular curvature and is coated with a phosphor.

References Cited by the Examiner

UNITED STATES PATENTS

| | | | |
|---|---|---|---|
| 2,189,583 | 2/1940 | Hollmann | 346—110 |
| 2,313,119 | 3/1943 | Brand | 95—4.5 |
| 2,392,440 | 1/1946 | Waller | 352—69 |
| 2,485,556 | 10/1949 | Bion | 178—6.8 |
| 2,794,379 | 6/1957 | McNeil | 95—16 |
| 2,893,300 | 7/1959 | Fajardo | 95—16 |
| 2,966,096 | 12/1960 | D'Incerti | 95—15 X |
| 3,062,108 | 11/1962 | Mayo | 95—1.7 |
| 3,067,407 | 12/1962 | Schaaf | 346—11 X |
| 3,113,484 | 12/1963 | Baker | 88—24 X |

FOREIGN PATENTS

| | | |
|---|---|---|
| 1,248,378 | 10/1960 | France. |
| 129,646 | 4/1902 | Germany. |

JOHN M. HORAN, *Primary Examiner.*